United States Patent
Hijl

(10) Patent No.: US 7,415,468 B1
(45) Date of Patent: Aug. 19, 2008

(54) METHOD OF IDENTIFYING AND REGISTERING ENTITIES AND AN ASSEMBLY OF HARDWARE AND SOFTWARE FOR APPLYING SUCH A METHOD

(76) Inventor: Benno Henricus Nicolaas Hijl, Julianastraat 50, Veghel (NL) 5462 HD ( * ) Notice: Subject to any disclaimer, the term of this patent is extended or adjusted under 35 U.S.C. 154(b) by 191 days.

(21) Appl. No.: 10/031,883

(22) PCT Filed: Jul. 28, 2000

(86) PCT No.: PCT/NL00/00539

§ 371 (c)(1),
(2), (4) Date: Apr. 22, 2002

(87) PCT Pub. No.: WO01/08375

PCT Pub. Date: Feb. 1, 2001

(51) Int. Cl.
  G06F 17/30 (2006.01)
(52) U.S. Cl. .............................. 707/10; 707/3; 707/101; 707/102; 709/227; 715/234
(58) Field of Classification Search .................. 707/10, 707/100, 104.1, 3, 101, 102; 709/227, 228, 709/203, 217, 229; 715/501.1, 234; 701/211; 455/456
  See application file for complete search history.

(56) References Cited

U.S. PATENT DOCUMENTS

| 5,086,215 | A | * | 2/1992 | Carsner et al. | 235/462.08 |
| 5,664,170 | A | * | 9/1997 | Taylor | 707/102 |
| 5,862,325 | A | * | 1/1999 | Reed et al. | 709/201 |
| 6,016,512 | A | * | 1/2000 | Huitema | 707/100 |
| 6,122,520 | A | * | 9/2000 | Want et al. | 701/211 |
| 6,167,449 | A | * | 12/2000 | Arnold et al. | 709/227 |
| 6,219,818 | B1 | * | 4/2001 | Freivald et al. | 707/10 |
| 6,226,654 | B1 | * | 5/2001 | Van Hoff | 715/501.1 |
| 6,564,216 | B2 | * | 5/2003 | Waters | 707/10 |
| 6,697,806 | B1 | * | 2/2004 | Cook | 707/10 |

OTHER PUBLICATIONS

Zatti S: "Naming in OSI: Distinguished Names or Object Identifiers?" Proceedings of the Annual European Computer Conference. , US, Los Alamitos, IEEE. Comp. Soc. Press, vol. Conf. 5, 1991, pp. 258-262.
Weirich T: "Filofax Fuers Internet" CT Magazin FUER Computer Technik, DE, Verlag Heinz Heise GMBH., Hannover, No. 10, Oct. 1, 1997, pp. 346-348, 350-355.

\* cited by examiner

*Primary Examiner*—Shahid A Alam
(74) *Attorney, Agent, or Firm*—The Webb Law Firm

(57) ABSTRACT

The invention relates to a method of identifying and registering entities, in particular for internet applications, comprising the processing steps of: a) defining a URL/domain name system in accordance with a system of identification codes, b) formulating URL/domain name notation rules in accordance with the defined system of identification codes, and c) designating codes and the associated URLs/domain names on the basis of the defined system of identification codes and in accordance with the formulated URL/domain name notation rules. The invention also relates to an assembly of hardware and software for applying this method.

11 Claims, 4 Drawing Sheets

| | | 7 |
|---|---|---|
| www.country.reg | www.0031.uni | www.0031.com ← 6 |
| www.country-region.reg | www.0031-413.uni | www.0413.nl ← 8 |
| www.country-region-subscriber.reg | www.0031-413-342829.uni | www.0413-342829.nl ← 9 |

FIG. 1

| www.code.reg /countrynr | www.000.uni /0031 | www.000.com/0031 |
|---|---|---|
| www.code.reg /countrynr/regionnr | www.000.uni /0031/413 | www.000.com/0031/0413 |
| www.code.reg /countrynr/regionnr/subscribernr | www.000.uni /0031/413/342829 | www.000.com/0031/0413/342829 |

FIG. 2

| www.countrynumber.reg | www.123.uni | www.123.net |
|---|---|---|
| www.regionnumber.reg | www.123-456.uni | www.123-456.net |
| www.subscribernumber.reg | www.123-456-123456.uni | www.123-456-123456.net |

FIG. 3

| www.code.reg /countrynr | www.000.uni /123 | www.000.net/123 |
|---|---|---|
| www.code.reg /countrynr/regionnr | www.000.uni /123/456 | www.000.net/123/456 |
| www.code.reg /countrynr/regionnr/subscribernumber | www.000.uni /123/456/123456 | www.000.net/123/456/123456 |

FIG. 4

METHOD OF IDENTIFYING AND REGISTERING ENTITIES AND AN ASSEMBLY OF HARDWARE AND SOFTWARE FOR APPLYING SUCH A METHOD

BACKGROUND OF THE INVENTION

1. Field of the Invention

The invention relates to a method of identifying and registering persons, in particular for internet applications, and to an assembly of hardware and software for applying such a method.

2. Brief Description of the Prior Art

The internet is a fast-growing medium, which, from a communication viewpoint, consists of Top Level Domains (TLDs), internet addresses (Uniform Resource Locators (URLs)), internet sites with information, search engines, users and access providers. Top Level Domains such as "com", "net", "org", "edu", "gov", "mil" etc. are defined on the basis of a worldwide open organization structure. The structure of naming is based on internationally standardized character sets. There are also Sub-Level Domains (SLDs) which are country-specific: "us", "uk", "nl" etc. The general search engines available are focussed particularly on searching sites by content. The worldwide character and the infinite possibilities in respect of the publication of information and message traffic make it essentially a medium with particularly attractive use potential. It is thought that internet at this moment is at its initial stage. Characteristic of the present situation is that heretofore internet has been designed mainly by engineers and that at the moment the providers and users are located for the most part in industrialized countries. It is expected that the number of users and providers will only increase in the future. Through wider application the internet will also undergo further changes so as to make it more of a user medium with unrivalled possibilities and with a broad, worldwide degree of participation.

Seen from a worldwide viewpoint, there is at the moment quite a low internet participation and a mediocre spread of providers and users. The main causes for this lack of spread, in addition of course to the relatively short existence of internet, are to be found in aspects such as technical possibilities, cost, the anticipated utilization, retrievability, position in respect of for instance competitors and so on. The internet has an essentially worldwide orientation. Powerful options aimed specially at (inter)local and (inter)regional oriented use (other than on SLDs) are lacking. In the present situation on the internet, searching for a URL/domain name is practically only possible via the internet. Within the internet unclear or confusing naming is possible for URLs/domain names, for instance due to more or less unobstructed use of names of general importance and/or significance. It is generally difficult to be directly retrievable as provider on internet on the basis of URL/domain name. Particularly in the case of frequently occurring names it is in fact impossible to register for each applicant a suitable, distinctive and retrievable URL/domain name. The first registration of a URL/domain name by a user/provider can thus result in a great advantage. An additional drawback of a first registration is that third parties often register URLs/domain names on a large scale having as content the name of for instance a well-known personality or company, whereby the obvious URL/domain name in question is taken, and alleged improper use of a name is thereby made in respect of the alleged entitled person. With the current practice surrounding naming of URLs/domains there is a language and character problem. That is, the problem that in written form each language or group of languages employs its own set of letters and characters. Search engines therefore have the limitation in respect of the following: as search result for a search term in a particular language all that is generally obtained is the information found which is available in the same language. National languages hereby acquire a significant influence in all information queries, this while language could be an insignificant aspect of countless queries or need not represent a barrier. The use of URLs/domain names is often difficult because the URLs/domain names are often too long and complicated. The URL notation moreover contains little functional logic. Search engines often have a worldwide orientation in terms of technical possibilities but, due to the manner of searching by information content in a site and the language barrier which thereby becomes manifest, they are often language-dependent in use and not very regionally oriented. In many of the present search engines on the internet there is an inadequately defined relation between query and result. The present search engines for general purposes search by content in a site on the basis of search terms entered by the user. Searching usually proceeds with difficulty and the search results are in many cases mediocre or poor. Through the manner of searching (for details concerning content), the present information provision and the growth of internet (applications) which can be expected in the future, results of queries based on search terms which are not very specific will to an increasing extent produce unusable results. The use of search engines is generally not intuitive. Specific reduction of the search field in a usual, intuitive manner (this may be essential for determined queries) prior to a detailed query is scarcely possible with the existing search engines suitable for general use. At the moment TLDs are defined on the basis of a worldwide, open organizational structure with few restrictions in URLs/domain names and they therefore provide few specific options for use.

The publication by S. Zatti: "Naming in OSI: "Distinguished Names or Object Identifiers?", Proceedings of the Annual European Computer Conference (Compeuro), US, Los Alamitos, IEEE, Computer Society Press, part-conference 5, 1991, pages 258-262" describes two identification schemes, i.e. Distinguished Names (DN) and Object Identifiers (OI), which are used on a large scale in an OSI environment. The DN scheme is sufficiently flexible and powerful to provide the worldwide need for names. The OI scheme has the possibility of incorporating special criteria imposed by individual requirements. The problem of these schemes is that in the present form they cannot be integrated into each other, thus creating a need to design a system which, within the possibilities of OSI and worldwide networks, provides a uniform naming scheme to identify all types of objects. The publication proposes a uniform solution, wherein both schemes can exist side by side in one environment, solely through a minimal modification in said schemes.

The present invention has for its object to provide an improved device for registering, addressing, structuring and finding persons and data, particularly for internet applications, while retaining the advantages of the prior art but without the limitations of the prior art. Persons should in this context be understood as natural persons, legal persons, organisations or objects. The invention is intended to improve the capabilities of searching and finding these persons on the Internet and for instance to list the results of a conducted search.

SUMMARY OF THE INVENTION

The present invention provides for this purpose a method of identifying and registering persons based on existing identification codes, in particular for internet applications, comprising the processing steps of: a) defining a URL/domain name system in accordance with a system of the identification codes stored in at least one database, b) formulating URL/domain name notation rules in accordance with the defined system of identification codes, and c) designating codes and the associated URLs/domain names on the basis of the defined system of identification codes and in accordance with the formulated URL/domain name notation rules, and implementing at least a part of the URLs/domain names in the internet.

The method preferably also comprises the processing steps of: d) registering data of persons, e) creating a data carrier on the basis of the registered data, and f) linking the data carrier to a specific URL/domain name. By replacing names and/or words in a URL/domain name by an identification code associated with a user/provider and registering this in accordance with notation rules suitable for the code there results a better retrievability through a logical and/or known relation between provider or that which is provided and the registered URL/domain name. In addition, this provides the option of finding URLs and information on the internet, at least when the specific URLs/domain names, according to preferred embodiments, are made accessible to the public and/or when services are provided by means of a data carrier, such as for instance the specific URLs/domain names or a page with hyperlinks, by making use of other non-internet-related (search) systems and media which are based on the same system of identifications. When an existing identification code is used, potential registrants can be approached in purposeful manner, wherein use can be made of a possibly already existing search system. Depending on the identification code used, the participation among general or specific groups can hereby be increased. The use of identification codes in a URL/domain name creates a term-free/value-free URL/domain name without any significance in itself. Language problems can be obviated by the use of identification codes and associated structure, even when this involves the permitted characters, which are obviated to a considerable extent in URL naming. The verbal transfer can become easier and more unambiguous due to specific and functionally limiting notation rules. Through the use of identification codes and notation rules the structure of the internet, and therewith the logic, is increased. Making use of the notation rules and the structure ensuing therefrom enables refinement of the search field (at URL level), also without use having to be made of a search engine for this purpose. As the internet grows (users/providers) the functionality can also be increased and transparency can remain ensured. Owing to the combination used according to the invention of TLD, identification code, linked data registration and publication and data search and retrieve options, the retrievability, equivalency and so on are increased and participation in the internet can grow considerably. While the Zatti publication describes a uniform system of identification codes (name scheme), the method according to the present invention differs herefrom, among other ways in that no unitary method of identification is described in Zatti but a linking of a plurality of identification systems. This provides no solution, particularly at user level. The Zatti publication merely creates through identification a distinction between objects or names, while the present invention, in addition to creating a distinction, also increases the functionality and the transparency of the internet when compared to the present invention. Nor does the Zatti publication establish any relation with internet applications.

The German publication by T. Weihrich: "Filofax fürs Internet", CT Magazin für Computer Technik, DE, Verlag Heinz Heise GMBH, Hannover, number 10, 1 Oct. 1997 (1997-10-01), pages 346-348, 350-355, XP000701086, ISSN: 0724-8679, describes the necessity of the presence of a 'Domain Name Server' (DNS) to find the Internet Protocol (IP) address associated with a URL/domain name. Since the IP addresses consist of a twelve-digit combination and there is lack of a structure and logic, a DNS is essential. The URLs/domain names are purely for the purpose of improving the user-friendliness of the internet and serve purely as aid. The actual communication proceeds via the IP addresses. The DNS has the task of establishing the link from URL/domain name to associated IP address and vice-versa. Due to the limited nature of the available internet domains and the increasing degree of large-scale buying up of domain names, different internet organisations and internet providers have been discussing an increase in the available TLDs and associated organization. Up until now the American government has obstructed such an increase. This publication argues the case for a logic in the IP addresses, referring to the URLs/domain names, so that a DNS will ultimately become unnecessary, and also argues for an increase in the number of available internet addresses. Even in combination with the above discussed publication by Zatti, the Weihrich publication does not provide the method according to the invention, with which a highly simplified communication on the internet is made possible with an essentially different definition of URLs/domain names. An additional difference between the Weihrich publication and the present invention is that the method as stated in the publication has a purely technical objective in which the user is not directly involved, while in the present invention, on the contrary, the method is specifically designed for the user.

The method preferably also comprises the processing steps of: i) incorporating registered data of persons in data files, j) incorporating the data files in a search system, and k) providing an interface with search options for generating on request results such as for instance URLs/domain names as a response to a query. The method can herein be applied within Top Level Domains and/or Sub Level Domains designed specifically for this purpose. A search engine which operates by means of the method according to the invention searches on the basis of register data. This data is registered in combination with and linked to a URL/domain. Through registration of relevant (search) terms in the register it is possible to search simply and effectively and there results a clearer relation between query and the result which can be anticipated. Search terms are defined by making use of register data, searching is simplified and the result more transparent and more readily predictable. There also results a defined relationship between query and the result which can be expected. The search field can preferably be directed limited to a group of subscribers via the search engine by entering search terms such as for instance country, area or sector. By making use of a TLD with function-oriented notation rules based on identification codes a strong relation can be created between TLD, URL/domain and the ultimate use function. Although the naming within the TLD thereby becomes restrictive, the functionality will hereby still be improved and options for use will be more effective and more focussed.

The invention also provides an assembly of hardware and software for applying said method, comprising a network of servers for designating and making available the URLs/domain names, at least one database coupled to the network of servers and having registered data of persons of URLs/domain names, and hardware and software for inputting, localizing and presenting the registered data. The properties of the servers can be multi-functional, i.e. a server can both make available and designate a URL/domain name. It could also be that each server is assigned its own task, so that for instance the one server is adapted to make available a URL/domain name and the other server to designate this URL/domain name. Updates can optionally be made at determined times on a secondary server of the operational primary servers, so that if a primary server breaks down, contact can be made with a secondary server, whereby the available URLs/domain names can always be retrieved, even after breakdown of a primary server.

BRIEF DESCRIPTION OF THE DRAWINGS

The invention will be elucidated with reference to the non-limitative embodiments shown in the following figures. Herein:

FIG. 1 shows a schematic view of a system of identification codes based on telephone numbers and the associated (mobile) number network.

FIG. 2 shows a schematic view of a second system of identification codes showing some resemblance to the system according to FIG. 1, FIG. 3 shows a schematic view of a third system of newly designed identification codes showing some resemblance to the systems according to FIGS. 1 and 2, FIG. 4 is a schematic view of a fourth system of identification codes showing some resemblance to the systems according to FIGS. 1, 2 and 3.

DETAILED DESCRIPTION OF THE PREFERRED EMBODIMENTS

Figure 5:
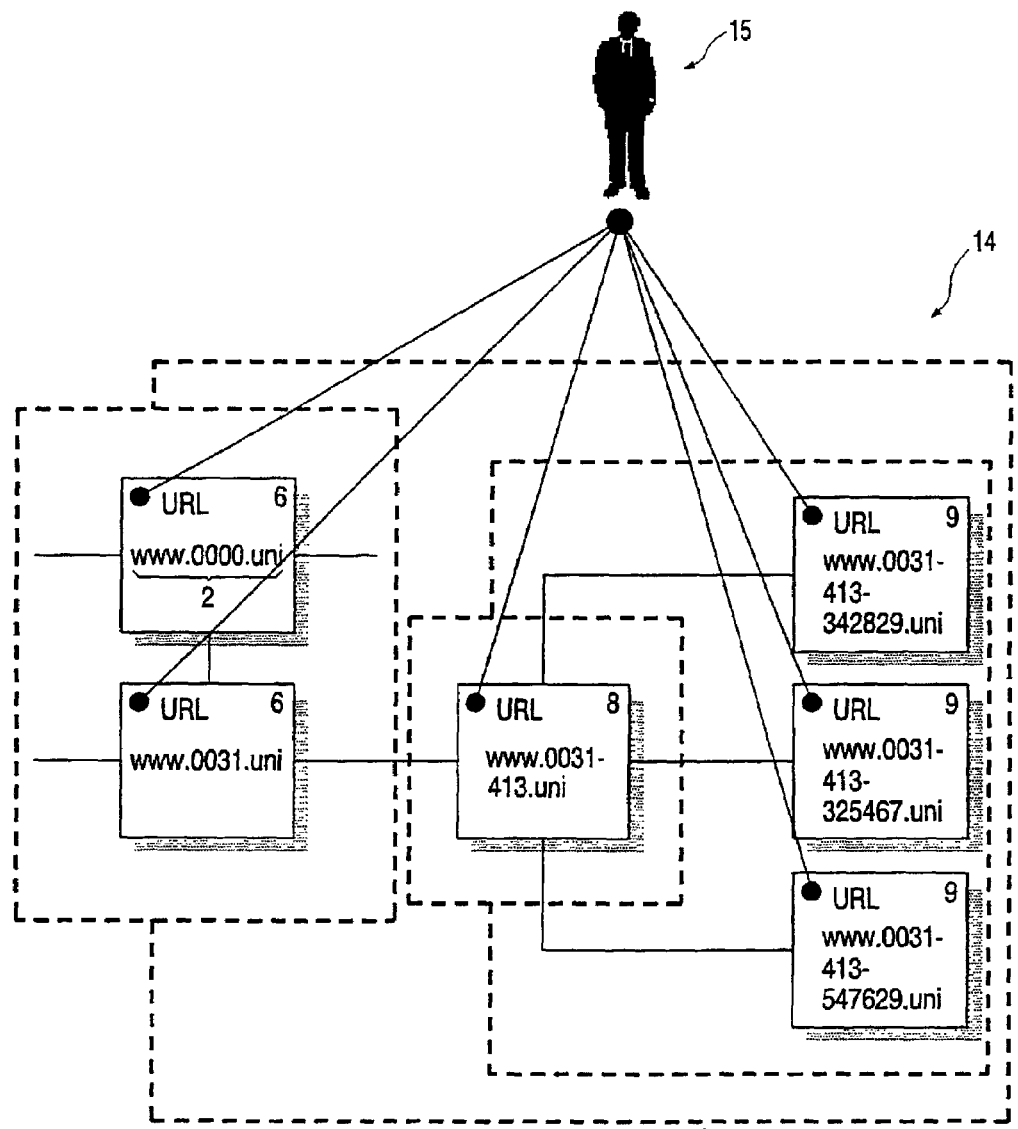
FIG. 5 is a schematic view of a method according to the invention for finding a URL.

FIG. 1 shows an example of a system 1 of identification codes based on telephone numbers and an associated (mobile) network. This system 1 of identifications is based on an already existing system of identifications, i.e. the existing system of unique subscriber numbers and area codes for telephone traffic. The system 1 of identification codes comprises internet addresses (URLs/domain names) 2 which are built up of a host 3, a sub-level domain 4 and a top-level domain 5. The URLs/domain names can also have a different detail structure, for instance by using dashes or other characters instead of dots. A national internet address 6 can be formulated per country, in which sub-level domain 4 is linked to the telephone code of the country in question. The top level domain 5 can consist of a register extension 7. This latter is chosen from a limited group of available register extensions (uni) such that each country preferably has the same register extension. An area internet address 8 preferably has the register extension 7 of the country associated with the area. The area code of the relevant area is preferably chosen as sub-level domain 4. Just as the area internet address 8, a subscriber address 9 preferably has the register extension 7 of the relevant country. Sub-level domain 4 comprises the (ten-digit Dutch) telephone number of the subscriber. On each country or area site it is possible to search in a register (not shown) of subscriber data using diverse key words. References can also be made to search engines, geographical maps, translation services, service numbers and so on.

FIG. 2 shows a second example of a system 10 for identifications based on telephone numbers and associated (mobile) number network. A choice has been made to opt for a uniform host 3, a sub-level domain 4 and top-level domain 5, and to place after top-level domain 5 a separator 11, in this example a "/" character, after which is placed the country code, area code or telephone number of the subscriber to be visited.

FIG. 3 shows a third example of a system 12 of identification codes based on codes and associated network. System 12 of identification codes is based on a new code system still to be further defined. The top-level domain 5 is preferably pre-assigned. The sub-level domain 4 comprises a country code, country code with area code, or country code with area code in combination with subscriber code.

FIG. 4 shows a fourth example of a system 13 of identification codes based on codes and associated network. As according to FIG. 3, the system 13 of identifications is based on codes still to be further defined. A choice has been made to opt for a uniform host 3, sub-level domain 4 and top-level domain 5, and to place after top-level domain 5 a separator 11, in this example a "/" character, after which is placed the country code, area code or telephone code of the subscriber to be visited.

FIG. 5 shows a scheme 14 for finding a URL 2. User 15 has the option of finding country sites 6, area sites 8 or sites of subscribers 9 by means of telephone directories, information services and the like. If the URL 2 of for instance a subscriber is known, this can then be visited directly. If this URL 2 is not known, it is then possible to search for a desired site at a level higher (country or area) using search engines or other links (hyperlinks).

Figure 6:
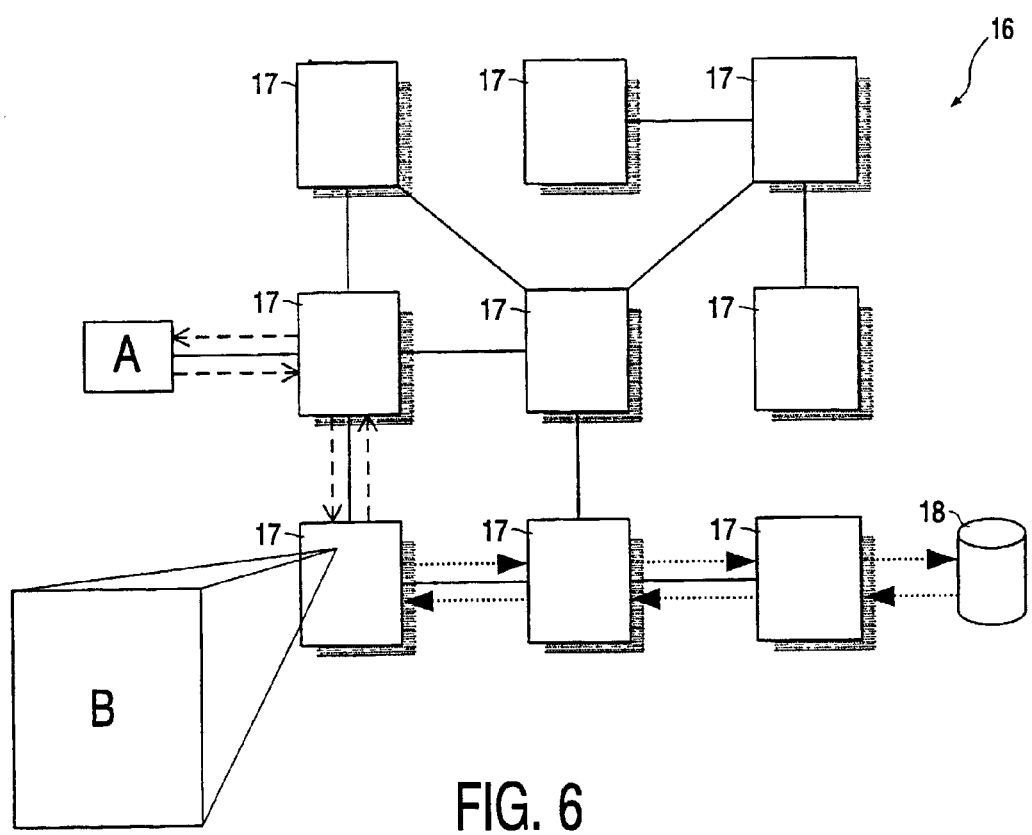
FIG. 6 is a schematic view of a network for finding a URL/domain name according to the invention.

FIG. 6 shows a network 16 for finding a URL 2. A symbolizes the browser of a user which is linked to a network 16 of servers 17. Browser A makes a connection with a search page B via one or more servers. A query entered on search page B by a user (not shown) is directed by means of one or more servers to a database 18. Database 18 has the capacity to link the queries entered on search page B to search results with associated URLs 2. The search results is sent over the network 16 of servers 17 and can then be received and published by browser A.

Figure 7:
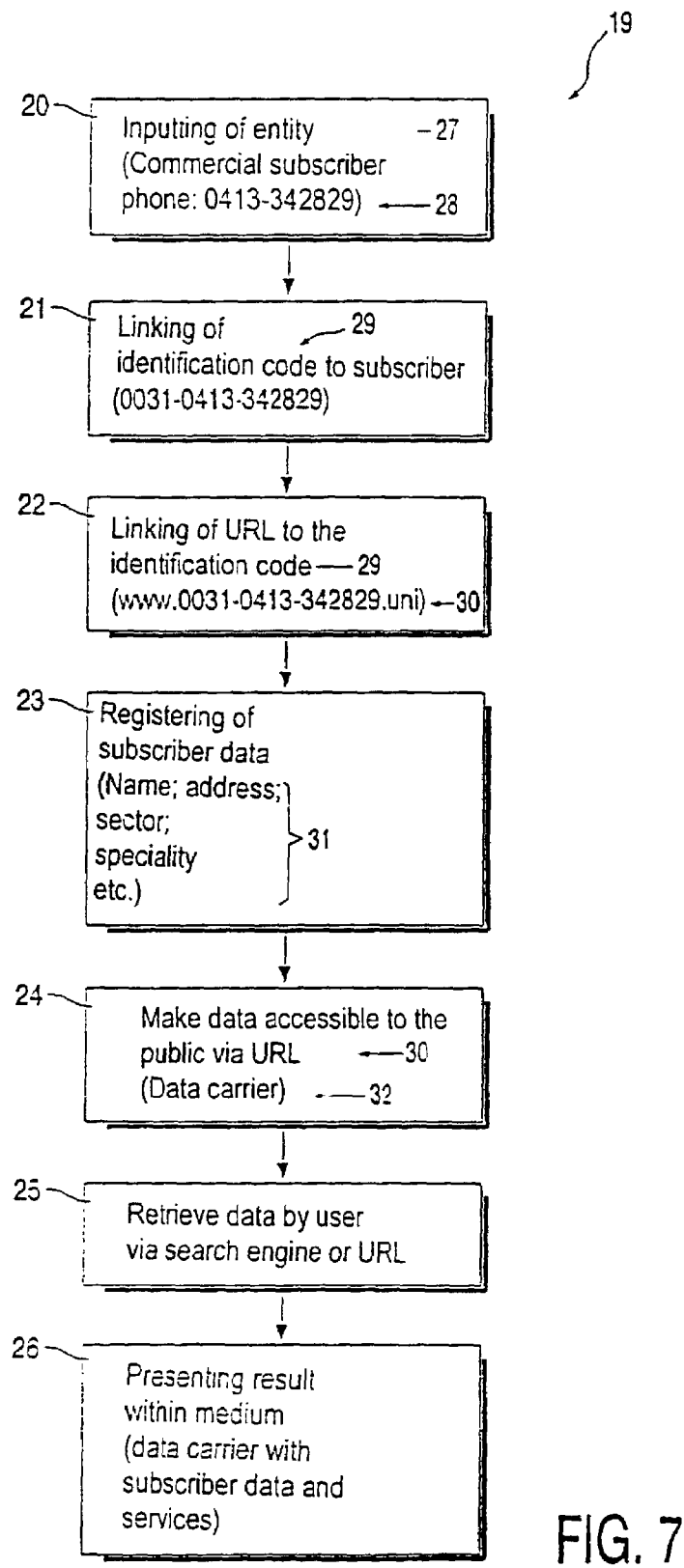
FIG. 7 is a schematic view of the successive processing steps according to the present invention for applying for a new URL/domain name.

FIG. 7 shows a sequence 19 of processing steps for applying for a new URL or subscriber identification 27. Step 20 describes inputting of a new Dutch subscriber 27 or person with the local telephone number 28 of 0413-342829. Linked to the new subscriber in step 21 is a specific identification code 29, which in this example is the complete international telephone number of the subscriber, 0031-0413-342829. In step 22 identification code 29 is linked to a unique URL 30, www.0031-0413-342829.uni. In step 23 the personal data 31 of subscriber 27, such as name, address, sector, speciality etc., are then registered. In step 24 the registered data 31 of subscriber 27 is made accessible to the public via URL 30 in the form of a web page on internet. This web page is referred to as a data carrier 32. A third party can retrieve the registered data 31 (step 25) using a browser (not shown) by making use of a search engine or directly via URL 30. In step 26 the results found on the basis of the queries made in step 25 are presented. The data carrier 32 with registered data 32 are now accessible to the third party. For reasons of privacy, sensitive information or other reasons sites can optionally be screened from the public domain or protected by a password.

The invention claimed is:

1. A method of identifying and registering persons based on pre-existing identification structure and data, in particular for Internet applications, comprising the processing steps of:
   a) selecting a discrete system apart from the Internet,
   b) designating a system and structure used for identification,
   c) defining a URL/domain name system in accordance with the structure from said discrete system apart from the Internet stored in at least one database having URL/domain name notation rules in accordance with the structure,
   d) designating a URL/domain name on the basis of the defined URL/domain name system using pre-existing identification data for persons, objects or subjects from said discrete system in accordance with the formulated URL/domain name notation rules, and implementing at least a part of the identification data and structure in URLs/domain names in the Internet,
   e) registering data of said person(s) in the discrete system in a search system,
   f) providing search functions based on key-words in said discrete system, including a top level search term and a sub-level search term in said search system,
   g) providing a link from said URL/domain name to a data carrier,
   h) providing a language neutral interface to said search system having search options, said interface providing a query limiting a possible search for searching registered data,
   i) limiting said search to a group of users in a top level domain when a top level domain search term is entered, said sub-level search term operating to limit a group of users within a sub-level domain,
   j) presenting search results of said search engine as URL/domain names or identification data in response to a query, and
   k) retrieving said data carrier in response to said results.

2. The method as claimed in claim 1, wherein the method also comprises the processing steps of:
   l) registering data of persons,
   m) creating a data carrier on the basis of the registered data, and
   n) linking the data carrier to a specific URL/domain name.

3. The method as claimed in claim 2, wherein the method further comprises the processing step of:
   o) making specific URLs/domain names accessible to the public.

4. The method as claimed in claim 2, wherein the method further comprises the processing step of:
   p) providing services by means of a data carrier.

5. The method as claimed in claim 2, wherein the method further comprises the processing steps of:
   q) incorporating registered data of persons in data files,
   r) incorporating the data files in a search system, and
   s) providing an interface with search options for generating results on request as a response to a query.

6. The method as claimed in claim 1, wherein the method is applied within specific Top Level Domains and/or Sub Level Domains.

7. The method as claimed in claim 1, wherein the structure is one of:
   a host, a sub-level domain, and a top-level domain with dots;
   a host, a sub-level domain, and a top-level domain with dashes; and
   a host, a sub-level domain, and a top-level domain followed by a separator character and after which is placed a country code, area code or telephone number of the subscriber to be visited.

8. The method as claimed in claim 1, wherein the discrete system comprises:
   a telephone directory of a telephone network,
   a telephone directory of a mobile telephone network.

9. An assembly of hardware and software for identifying and registering persons based on pre-existing identification structure and data, in particular for Internet applications, comprising the processing steps of:
   a) selecting a discrete system apart from the Internet,
   b) designating a system and structure used for identification,
   c) defining a URL/domain name system in accordance with the structure from the discrete system apart from the Internet stored in at least one database having URL/domain name notation rules in accordance with the structure,
   d) designating a URL/domain name on the basis of the defined URL/domain name system using pre-existing identification data for persons, objects or subjects from said discrete system in accordance with the formulated URL/domain name notation rules, and implementing at least a part of the identification data and structure in URL/domain names in the Internet, the assembly comprising:
      a network of servers for designating and making available the URLs/domain names,
      at least one database coupled to the network of servers and having registered data of persons of URLs/domain names,
      hardware and software for inputting, localizing and presenting the registered data,
   e) registering data of said person(s) in the discrete system in a search system,
   f) providing search functions based on key-words in said discrete system, including a top level search term and a sub-level search term in said search system,
   g) providing a link from said URL/domain name to a data carrier,
   h) providing a language neutral interface to said search system having search options, said interface providing a query limiting a possible search for searching registered data,
   i) limiting said search to a group of users in a top level domain when a top level domain search term is entered, said sub-level search term operating to limit a group of users within a sub-level domain,
   j) presenting search results of said search engine as URL/domain names or identification data in response to a query, and
   k) retrieving said data carrier in response to said results.

10. The method as claimed in claim 9, wherein the structure is one of:
   a host, a sub-level domain, and a top-level domain with dots;
   a host, a sub-level domain, and a top-level domain with dashes; and
   a host, a sub-level domain, and a top-level domain followed by a separator character and after which is placed a country code, area code or telephone number of the subscriber to be visited.

11. The method as claimed in claim 9, wherein the discrete system comprises:
   a telephone directory of a telephone network,
   a telephone directory of a mobile telephone network.

* * * * *